US012190679B2

(12) United States Patent
Delekta et al.

(10) Patent No.: US 12,190,679 B2
(45) Date of Patent: Jan. 7, 2025

(54) MEMORY-EFFICIENT SYMBOL CREDIT VALUE GENERATION SYSTEM

(71) Applicant: Aristocrat Technologies, Inc., Las Vegas, NV (US)

(72) Inventors: Scott Delekta, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 148 days.

(21) Appl. No.: 17/811,267

(22) Filed: Jul. 7, 2022

(65) Prior Publication Data

US 2024/0013620 A1 Jan. 11, 2024

(51) Int. Cl.
*G07F 17/32* (2006.01)

(52) U.S. Cl.
CPC ...... *G07F 17/3244* (2013.01); *G07F 17/3227* (2013.01)

(58) Field of Classification Search
CPC ......................... G07F 17/3227; G07F 17/3244
See application file for complete search history.

(56) References Cited

U.S. PATENT DOCUMENTS 5,833,537 A 11/1998 Barrie
5,935,002 A 8/1999 Falciglia
6,186,894 B1 2/2001 Mayeroff
7,237,775 B2 7/2007 Thomas
7,445,547 B2 11/2008 Suzuki
7,780,519 B2 8/2010 Gomez
7,963,846 B2 * 6/2011 Englman ............. G07F 17/3258 463/19
8,172,665 B2 5/2012 Hoffman
8,226,468 B2 7/2012 Hoffman
8,371,928 B2 2/2013 Englman
8,388,438 B2 3/2013 Englman
8,460,092 B1 6/2013 Slomiany
8,591,308 B2 11/2013 Hoffman
9,135,785 B2 9/2015 Hoffman
(Continued)

FOREIGN PATENT DOCUMENTS

AU 2019204175 2/2020

OTHER PUBLICATIONS

Notice of Allowance dated Oct. 27, 2021 for U.S. Appl. No. 16/948,606 (pp. 1-8).
Aristocrat, Welcome to Fantastic Jackpots—Fantastic Cash, https://www.aristocrat.com/anz/games/welcome-to-fantastic-jackpots-fantastic-cash/, Aug. 2018, (1 Page).
Notice of Allowance dated Apr. 5, 2021 for U.S. Appl. No. 16/538,623 (pp. 1-9).
(Continued)

*Primary Examiner* — David L Lewis
*Assistant Examiner* — Robert E Mosser
(74) *Attorney, Agent, or Firm* — Weaver Austin Villeneuve & Sampson LLP

(57) ABSTRACT

Memory-efficient techniques for assigning credit values to credit symbols in games of chance are provided. Such techniques allow such credit values to be displayed in ascending or descending order while still allowing for control of the rate at which the credit values grow (or decrease) in value. Moreover, such techniques allow the particular sequences of credit values that are assigned to be dynamically generated from one game to the next, thereby avoiding potentially repetitive use of a limited number of pre-defined credit value sequences to assign credit values or the need for large numbers of pre-defined credit value sequences that may unnecessarily consume memory.

20 Claims, 14 Drawing Sheets

(56) References Cited

U.S. PATENT DOCUMENTS

| | | | | |
|---|---|---|---|---|
| 9,251,667 | B2 * | 2/2016 | Marks | G07F 17/3262 |
| 9,449,470 | B2 | 9/2016 | Baerlocher | |
| 9,530,287 | B2 | 12/2016 | Hoffman | |
| 9,564,006 | B2 | 2/2017 | Ryan | |
| 9,600,979 | B2 | 3/2017 | Hornik | |
| 9,640,025 | B2 | 5/2017 | Saunders | |
| 9,691,231 | B2 | 6/2017 | Fujisawa | |
| 9,824,527 | B2 | 11/2017 | Evans | |
| 9,836,915 | B2 | 12/2017 | Meyer | |
| 9,940,775 | B2 | 4/2018 | Eaton | |
| 10,152,845 | B2 | 12/2018 | Pawloski | |
| 10,388,112 | B2 | 8/2019 | You | |
| 10,403,093 | B1 | 9/2019 | Halvorson | |
| 10,410,477 | B2 | 9/2019 | Hoffman | |
| 2003/0022712 | A1 | 1/2003 | Locke | |
| 2003/0092487 | A1 | 5/2003 | Meyer | |
| 2004/0033827 | A1 | 2/2004 | Gilmore | |
| 2004/0048646 | A1 | 3/2004 | Visocnik | |
| 2004/0053676 | A1 | 3/2004 | Rodgers | |
| 2005/0059459 | A1 | 3/2005 | Dunn | |
| 2006/0189380 | A1 | 8/2006 | Schultz | |
| 2007/0026923 | A1 | 2/2007 | Muir | |
| 2007/0060265 | A1 | 3/2007 | Marks | |
| 2007/0238510 | A1 | 10/2007 | Halprin | |
| 2008/0242404 | A1 | 10/2008 | Aoki | |
| 2009/0325681 | A1 | 12/2009 | Englman | |
| 2010/0298041 | A1 | 11/2010 | Berman | |
| 2011/0045894 | A1 | 2/2011 | Owen | |
| 2011/0124405 | A1 | 5/2011 | Okada | |
| 2012/0202570 | A1 | 8/2012 | Schwartz | |
| 2014/0274284 | A1 | 9/2014 | Leupp | |
| 2015/0018070 | A1 | 1/2015 | Meyer | |
| 2015/0024826 | A1 | 1/2015 | Ghaly | |
| 2015/0087382 | A1 | 3/2015 | Gilbertson | |
| 2015/0087385 | A1 | 3/2015 | Shiraishi | |
| 2015/0094132 | A1 | 4/2015 | Elias | |
| 2015/0213672 | A1 | 7/2015 | Elias | |
| 2015/0339889 | A1 | 11/2015 | Oropeza | |
| 2015/0363999 | A1 | 12/2015 | Little | |
| 2016/0093150 | A1 | 3/2016 | Penacho | |
| 2016/0203670 | A1 | 7/2016 | Ford | |
| 2016/0247361 | A1 | 8/2016 | Meyer | |
| 2017/0011582 | A1 | 1/2017 | Fong | |
| 2018/0025585 | A1 | 1/2018 | Schmidt | |
| 2018/0061176 | A1 | 3/2018 | Berman | |
| 2018/0130286 | A1 | 5/2018 | Berman | |
| 2018/0268659 | A1 | 9/2018 | Chesworth | |
| 2019/0139371 | A1 | 5/2019 | Lamb | |
| 2019/0206191 | A1 | 7/2019 | Halvorson | |
| 2019/0287336 | A1 | 9/2019 | Prabhu | |
| 2019/0304255 | A1 | 10/2019 | San | |
| 2020/0051373 | A1 | 2/2020 | Meyer | |
| 2020/0111291 | A1 | 4/2020 | Pariseau | |
| 2020/0168053 | A1 | 5/2020 | Berman | |

OTHER PUBLICATIONS

Notice of Allowance dated Aug. 31, 2021 for U.S. Appl. No. 16/948,606 (pp. 1-9).
Office Action dated Sep. 13, 2021 for U.S. Appl. No. 16/948,607 (pp. 1-16).
Office Action (Non-Final Rejection) dated Dec. 22, 2021 for U.S. Appl. No. 16/950,000 (pp. 1-16).
Notice of Allowance dated Feb. 9, 2022 for U.S. Appl. No. 16/948,606 (pp. 1-2).
Notice of Allowance dated Feb. 23, 2022 for U.S. Appl. No. 16/948,607 (pp. 1-9).
Office Action (Final Rejection) dated Jul. 5, 2022 for U.S. Appl. No. 16/950,000 (pp. 1-15).
Office Action dated Aug. 12, 2021 for U.S. Appl. No. 16/948,308 (pp. 1-17).
Office Action dated Jan. 13, 2022 for U.S. Appl. No. 16/948,308 (pp. 1-6).
Office Action (Non-Final Rejection) dated Mar. 24, 2022 for U.S. Appl. No. 16/948,309 (pp. 1-24).
Office Action (Notice of Allowance and Fees Due (PTOL-85)) dated Jun. 7, 2022 for U.S. Appl. No. 16/948,308 (pp. 1-8).
Office Action (Notice of Allowance and Fees Due (PTOL-85)) dated Sep. 27, 2022 for U.S. Appl. No. 16/948,308 (pp. 1-8).
Office Action (Final Rejection) dated Oct. 26, 2022 for U.S. Appl. No. 16/948,309 (pp. 1-23).
Office Action (Notice of Allowance and Fees Due (PTOL-85)) dated Nov. 3, 2022 for U.S. Appl. No. 17/366,307 (pp. 1-5).
Office Action (Notice of Allowance and Fees Due (PTOL-85) dated Nov. 10, 2022 for U.S. Appl. No. 17/366,307 (pp. 1-2).
Office Action (Notice of Allowance and Fees Due (PTOL-85)) dated Dec. 14, 2022 for U.S. Appl. No. 16/950,000 (pp. 1-8).
Office Action (Notice of Allowance and Fees Due (PTOL-85)) dated Feb. 1, 2023 for U.S. Appl. No. 16/948,308 (pp. 1-8).
Office Action (Notice of Allowance and Fees Due (PTOL-85) dated Feb. 8, 2023 for U.S. Appl. No. 16/948,309 (pp. 1-9).
Office Action (Notice of Allowance and Fees Due (PTOL-85)) dated Mar. 16, 2023 for U.S. Appl. No. 16/948,309 (pp. 1-2).
Office Action (Non-Final Rejection) dated Mar. 27, 2023 for U.S. Appl. No. 17/650,202 (pp. 1-8).
Office Action (Notice of Allowance and Fees Due (PTOL-85)) dated May 11, 2023 for U.S. Appl. No. 16/948,308 (pp. 1-2).
Office Action (Notice of Allowance and Fees Due (PTOL-85)) dated Jul. 10, 2023 for U.S. Appl. No. 17/650,202 (pp. 1-8).
Office Action (Notice of Allowance and Fees Due (PTOL-85)) dated Oct. 18, 2023 for U.S. Appl. No. 17/650,202 (pp. 1-2).
Office Action (Non-Final Rejection) dated Oct. 23, 2023 for U.S. Appl. No. 18/297,499 (pp. 1-5).
Office Action (Notice of Allowance and Fees Due (PTOL-85)) dated Dec. 21, 2023 for U.S. Appl. No. 18/297,499 (pp. 1-8).

* cited by examiner

1020

| List Pos. | Credit Value | Weight |
|---|---|---|
| 1 | 10 | 450000 |
| 2 | 25 | 350000 |
| 3 | 50 | 300000 |
| 4 | 75 | 250000 |
| 5 | 100 | 80000 |
| 6 | 125 | 20000 |
| 7 | 150 | 14000 |
| 8 | 175 | 12000 |
| 9 | 200 | 10000 |
| 10 | 250 | 8000 |
| 11 | 275 | 6000 |
| 12 | 300 | 4000 |
| 13 | 400 | 3000 |
| 14 | 500 | 2000 |
| 15 | 750 | 800 |
| 16 | 1000 | 300 |
| 17 | 1250 | 100 |
| 18 | 1500 | 50 |
| 19 | 2000 | 10 |
| 20 | 2500 | 5 |

1022 1022 1022

1024 1024 1024

1030

| Amount | Weight |
|---|---|
| 0 | 20 |
| 1 | 5 |
| 2 | 2 |
| 3 | 1 |

1032 1032 1032

1034 1034 1034

FIG. 10

1220

| List Pos. | Credit Value | Weight | Positional Offset List |
|---|---|---|---|
| 1 | 10 | 450000 | A |
| 2 | 25 | 350000 | |
| 3 | 50 | 300000 | |
| 4 | 75 | 250000 | |
| 5 | 100 | 80000 | B |
| 6 | 125 | 20000 | |
| 7 | 150 | 14000 | |
| 8 | 175 | 12000 | |
| 9 | 200 | 10000 | C |
| 10 | 250 | 8000 | |
| 11 | 275 | 6000 | |
| 12 | 300 | 4000 | |
| 13 | 400 | 3000 | D |
| 14 | 500 | 2000 | |
| 15 | 750 | 800 | |
| 16 | 1000 | 300 | |
| 17 | 1250 | 100 | E |
| 18 | 1500 | 50 | |
| 19 | 2000 | 10 | |
| 20 | 2500 | 5 | |

1230

| | Positional Offset List A | Positional Offset List B | Positional Offset List C | Positional Offset List D | Positional Offset List E |
|---|---|---|---|---|---|
| Amount | Weight | Weight | Weight | Weight | Weight |
| 0 | 60 | 60 | 60 | 60 | 60 |
| 1 | 20 | 15 | 12 | 10 | 7 |
| 2 | 15 | 10 | 8 | 4 | 2 |
| 3 | 5 | 4 | 3 | 2 | 1 |

1232 1232 1232 1234 1234 1234

FIG. 12

MEMORY-EFFICIENT SYMBOL CREDIT VALUE GENERATION SYSTEM

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some instances, games of chance may include a game mechanic in which some symbols displayed as part of a game outcome may have credit or award values assigned thereto that are then awarded to the player of the game of chance.

SUMMARY

As noted above, in some games of chance, some game outcomes may feature one or more symbols that are associated with credit values that may then be awarded to the player. To increase player excitement, such symbols (which may be referred to herein as "credit symbols") may first be displayed as part of the game outcome without displaying the associated credit values. The credit value assigned to each credit symbol may then be revealed to the player, e.g., by superimposing an indication of the credit value over the credit symbol that it is associated with.

It may be desirable to further increase player excitement, in some cases, by displaying the credit values in a particular order, e.g., displaying the credit values for the credit symbols in a staggered fashion, starting with the lowest-value credit value and ending with the highest-value credit value, with each successive display of a credit value being for a credit value of either the same value or a higher value than the most recently displayed credit value. Thus, as credit values are displayed or revealed for credit symbols, the player's excitement builds since each time there is an increase in credit value, the player will know that the remaining credit symbols that have unrevealed credit values will be assigned at least that increased credit value (if not a higher credit value). In some implementations, such credit value displays may be reversed, e.g., the first credit value to be displayed may be the highest and the last credit value to be displayed the lowest. Such an implementation may similarly provide for increased player excitement.

One technique for determining such credit values is to have a table that defines a predetermined list of credit values that are to be assigned to a given number of credit symbols; such credit values can then be revealed to a player in the order defined by the table. For example, there may be a table that specifies that when six credit symbols are displayed as part of a game outcome, the credit values that are to be assigned to those credit symbols are 50, 100, 150, 200, 300, and 400 (and that such credit values are to be revealed in that order). However, if there is only a single table that defines such a credit value list for a given number of credit symbols, the player will likely rapidly learn that every time that given number, e.g., six, of credit symbols is displayed, the same credit values, e.g., 50, 100, 150, 200, 300, and 400, will be assigned to those credit symbols and displayed. There will consequently be little in the way of an element of surprise for the player, and the player may even start to resent the sequential display of credit values since such display is always the same for a given number of credit symbols.

In a similar technique, multiple such tables may be provided for a given number of credit symbols. When credit values are to be assigned to a given number of credit symbols, a selection may first be made between the different tables of credit values for that number of credit symbols; the credit values specified by the selected table of credit values may then be assigned to the credit symbols. The more such tables there are for a given number of credit symbols, the more variety there will be in the credit values that are assigned to the credit symbols and then displayed to the player.

While this technique avoids or mitigates the predictability issues associated with the previously discussed technique (one table per number of credit symbols), it multiplies or exacerbates other issues with the previously discussed technique. For example, each such table of credit values requires storage on a memory device of the system that is providing the game of chance—if one were to replace a single table of credit values for a given number of credit symbols with X tables of credit values for that number of credit symbols, then one could generally expect that X times as much memory would likely be required to store such multiple tables as compared to the single table. Moreover, games of chance—at least those playable for actual real-world currency—are often highly regulated. Each such table would typically require separate testing and validation in order to meet regulatory requirements, thereby increasing the time required for testing and validation.

An alternative technique that may be used to provide such credit values for a given number X of credit symbols is to randomly select X credit values from a list of credit values and to then sort them in the desired order, e.g., ascending or descending, and then reveal them in the player in the post-sort order. This technique avoids the predictability issues associated with the table-based approach discussed above but provides no ability to control the rate at which the selected credit values increase since the relative increases from credit value to next-highest credit value are only able to be determined once all of the credit values have already been randomly selected. As such, there is less ability to control game volatility using such a technique.

The disclosure below provides an alternative technique for determining credit values for credit symbols that avoids the issues discussed above. In such a technique, an initial credit value is assigned to a first symbol by randomly selecting a credit value from a list of possible credit values. Each credit value in the list may have a weighting associated therewith that may affect the chance of that particular credit value being selected as the initial credit value. Once the initial credit value has been assigned to one of the credit symbols, the credit values for the remaining credit symbols may be assigned. For each remaining credit symbol, a random selection of a positional offset may be made from a table or list of potential positional offsets. The positional offset identifies the credit value that is to be assigned by indicating how many list positions it is offset by from the list position of the most recently assigned credit value. Thus, for example, if the most recently assigned credit value is at position 5 in a list of 10 credit values and the positional offset that is selected is 2 list positions, then the credit value from position 7 of the list may be assigned.

There will typically be only a small number of potential positional offsets to select between. For example, in some instances, there may be only two potential positional offsets to select between for each credit value selection. In other instances, there may be three or four potential positional offsets to select between, or even more. Such selection of positional offsets may be performed randomly, with each potential positional offset having a weighting factor associated therewith that governs how likely it is to be randomly selected. In some instances, there may be different sets of positional offsets that are available, and the particular set that is selected for use may be selected based on, for example, the initial credit value selected.

Such a technique provides for dynamic selection of credit values for credit symbols that does not suffer from the memory issues of the multi-table technique discussed above or the lack of control over the growth rate of the selected credit values of the random selection followed by sorting technique discussed above. This allows for an engaging and dynamic game play experience for the player while avoiding inefficient use of system memory and still allowing for control of key game play parameters, such as the growth rate of the credit values that are assigned to credit symbols in a game outcome.

It will be understood that at least the following implementations are within the scope of this disclosure, although it will be further understood that additional implementations beyond those explicitly listed below may also be evident from this disclosure, and the list provided below is not to be considered limiting.

In some implementations, a system may be provided that includes one or more displays, one or more processors, and one or more memory devices. The one or more memory devices may store computer-executable instructions which, when executed by the one or more processors, cause the one or more processors to obtain a list of award values, wherein the award values are in a specified sequence in the list of award values and each award value of the award values is associated with a corresponding list position in the specified sequence, receive a first indication that a corresponding award value selected from the list of award values is to be associated with each symbol in a first set of one or more symbols displayed in a symbol display area of a game of chance, wherein the first set of one or more symbols includes at least a first symbol and zero or more additional symbols, determine an initial list position of the list positions, the initial list position indicating one of the list positions in the specified sequence, associate the award associated with the initial list position with the first symbol, determine, responsive to receipt of the first indication and for each additional symbol, if any, of the first set of one or more symbols, a corresponding cumulative positional offset, and associate, responsive to receipt of the first indication and for each additional symbol, if any, of the first set of one or more symbols, the award value having the corresponding list position that equals the initial list position plus the corresponding cumulative positional offset for that additional symbol.

In some implementations, the one or more memory devices may store further computer-executable instructions which, when executed by the one or more processors, further cause the one or more processors to determine the cumulative positional offset for each additional symbol, if any, of the first set of one or more symbols based on a corresponding positional offset for that additional symbol plus a most recent cumulative positional offset, if any, determined responsive to receipt of the first indication.

In some such implementations, the one or more memory devices may store further computer-executable instructions which, when executed by the one or more processors, further cause the one or more processors to determine each positional offset, if any, by causing a random outcome to be generated by a random number generator and selecting one of a plurality of positional offsets based on the random outcome to be that positional offset.

In some implementations, the one or more memory devices may store further computer-executable instructions which, when executed by the one or more processors, further cause the one or more processors to determine each positional offset, if any, by selecting a first set of positional offsets from a plurality of sets of positional offsets based on information associated with the initial list position, causing a random outcome to be generated by a random number generator, and selecting one of a plurality of positional offsets to be that positional offset from the first set of positional offsets based on the random outcome.

In some implementations, the one or more memory devices may store further computer-executable instructions which, when executed by the one or more processors, further cause the one or more processors to cause the award associated with each symbol in the first set of symbols to be displayed in association with display of that symbol in the reel display area.

In some such implementations, the one or more memory devices may store further computer-executable instructions which, when executed by the one or more processors, further cause the one or more processors to cause, in association with the receipt of the first indication, the displays of the awards associated with the additional symbols, if any, in the first set of symbols to be initiated sequentially in the same order as the corresponding cumulative offsets for the additional symbols are determined in association with the receipt of the first indication.

In some implementations, the award values may be listed in ascending order in the specified sequence. In some other implementations, the award values may be listed in descending order in the specified sequence.

In some implementations, one or more non-transitory, computer-readable media may be provided that store computer-executable instructions which, when executed by one or more processors, cause the one or more processors to obtain a list of award values, wherein the award values are in a specified sequence in the list of award values and each award value of the award values is associated with a corresponding list position in the specified sequence, receive a first indication that a corresponding award value selected from the list of award values is to be associated with each symbol in a first set of one or more symbols displayed in a symbol display area of a game of chance, wherein the first set of one or more symbols includes at least a first symbol and zero or more additional symbols, determine an initial list position of the list positions, the initial list position indicating one of the list positions in the specified sequence, associate the award associated with the initial list position with the first symbol, determine, responsive to receipt of the first indication and for each additional symbol, if any, of the first set of one or more symbols, a corresponding cumulative positional offset, and associate, responsive to receipt of the first indication and for each additional symbol, if any, of the first set of one or more symbols, the award value having the corresponding list position that equals the initial list position plus the corresponding cumulative positional offset for that additional symbol.

In some such implementations, the one or more non-transitory, computer-readable media may further store additional computer-executable instructions which, when executed by the one or more processors, further cause the one or more processors to determine the cumulative positional offset for each additional symbol, if any, of the first set of one or more symbols based on a corresponding positional offset for that additional symbol plus a most recent cumulative positional offset, if any, determined responsive to receipt of the first indication.

In some such implementations, the one or more non-transitory, computer-readable media may further store additional computer-executable instructions which, when executed by the one or more processors, further cause the one or more processors to determine each positional offset, if any, by causing a random outcome to be generated by a random number generator and selecting one of a plurality of positional offsets based on the random outcome to be that positional offset.

In some implementations, the one or more non-transitory, computer-readable media may further store additional computer-executable instructions which, when executed by the one or more processors, further cause the one or more processors to determine each positional offset, if any, by selecting a first set of positional offsets from a plurality of sets of positional offsets based on information associated with the initial list position, causing a random outcome to be generated by a random number generator, and selecting one of a plurality of positional offsets to be that positional offset from the first set of positional offsets based on the random outcome.

In some implementations, the one or more non-transitory, computer-readable media may further store additional computer-executable instructions which, when executed by the one or more processors, further cause the one or more processors to cause the award associated with each symbol in the first set of symbols to be displayed in association with display of that symbol in the reel display area.

In some such implementations, the one or more non-transitory, computer-readable media may further store additional computer-executable instructions which, when executed by the one or more processors, further cause the one or more processors to cause, in association with the receipt of the first indication, the displays of the awards associated with the additional symbols, if any, in the first set of symbols to be initiated sequentially in the same order as the corresponding cumulative offsets for the additional symbols are determined in association with the receipt of the first indication.

In some implementations, the award values may be listed in ascending order in the specified sequence. In some other implementations, the award values may be listed in descending order in the specified sequence.

In some implementations, a method may be provided. The method may include obtaining, by one or more processors, a list of award values stored in one or more memory devices, wherein the award values are in a specified sequence in the list of award values and each award value of the award values is associated with a corresponding list position in the specified sequence, receiving, by the one or more processors, a first indication that a corresponding award value selected from the list of award values is to be associated with each symbol in a first set of one or more symbols displayed in a symbol display area of a game of chance, wherein the first set of one or more symbols includes at least a first symbol and zero or more additional symbols, determining, by the one or more processors, an initial list position of the list positions, the initial list position indicating one of the list positions in the specified sequence, associating, by the one or more processors, the award associated with the initial list position with the first symbol, determining, by the one or more processors, responsive to receipt of the first indication, and for each additional symbol, if any, of the first set of one or more symbols, a corresponding cumulative positional offset, and associating, by the one or more processors, responsive to receipt of the first indication, and for each additional symbol, if any, of the first set of one or more symbols, the award value having the corresponding list position that equals the initial list position plus the corresponding cumulative positional offset for that additional symbol.

In some implementations, the method may further include determining the cumulative positional offset for each additional symbol, if any, of the first set of one or more symbols based on a corresponding positional offset for that additional symbol plus a most recent cumulative positional offset, if any, determined responsive to receipt of the first indication.

In some such implementations, the method may further include determining each positional offset, if any, by causing a random outcome to be generated by a random number generator and selecting one of a plurality of positional offsets based on the random outcome to be that positional offset.

In some implementations of the method, the method may further include determining each positional offset, if any, by selecting a first set of positional offsets from a plurality of sets of positional offsets based on information associated with the initial list position, causing a random outcome to be generated by a random number generator, and selecting one of a plurality of positional offsets to be that positional offset from the first set of positional offsets based on the random outcome.

In some implementations, the method may further include causing the award associated with each symbol in the first set of symbols to be displayed in association with display of that symbol in the reel display area.

In some such implementations, the method may further include causing, in association with the receipt of the first indication, the displays of the awards associated with the additional symbols, if any, in the first set of symbols to be initiated sequentially in the same order as the corresponding cumulative offsets for the additional symbols are determined in association with the receipt of the first indication.

In some implementations, the award values may be listed in ascending order in the specified sequence. In some other implementations, the award values may be listed in descending order in the specified sequence.

In some implementations, a system may be provided that includes one or more displays, one or more processors, and one or more memory devices. The one or more memory devices may store computer-executable instructions which, when executed by the one or more processors, cause the one or more processors to determine an award value or award values to associate with at least one credit symbol of a plurality of symbols displayed in a symbol display area in association with a play of a game of chance by selecting, for each such credit symbol, an award value from an award value list, wherein each selection of an award value from the award value list is of an award value that is in a list position in the award value list that is offset by a first number of list positions from the list position of the award value most recently selected from the award value list in association with the play of the game of chance, wherein the first number is greater than or equal to zero. The instructions, when executed, may further cause the one or more processors to cause each award value selected for each such credit symbol to be displayed in association with that credit symbol in the symbol display area.

In some such implementations, the one or more memory devices may store further computer-executable instructions which, when executed by the one or more processors, further cause the one or more processors to, for each selection of one of the award values, randomly select the first number from a first set of positional offsets.

In some further such implementations, the one or more memory devices may store further computer-executable instructions which, when executed by the one or more processors, further cause the one or more processors to determine an initial award value to associate with a first credit symbol of the plurality of symbols prior to determining the award value or award values to associate with the at least one credit symbol of the plurality of symbols, and select the first set of positional offsets from a plurality of sets of positional offsets based on information associated with the initial award value.

In some implementations, the one or more memory devices may store further computer-executable instructions which, when executed by the one or more processors, further cause the one or more processors to cause the award value associated with each credit symbol to be displayed in association with display of that symbol in the reel display area.

In some implementations, the one or more memory devices may store further computer-executable instructions which, when executed by the one or more processors, further cause the one or more processors to cause the displays of the award values associated with the credit symbols to be initiated sequentially in the same order as the award values are determined for association with the credit symbols.

In some implementations, the award values may be listed in ascending order in the award value list. In some other implementations, the award values may be listed in descending order in the award value list.

In some implementations, one or more non-transitory, computer-readable media storing computer-executable instructions may be provided. The computer-executable instructions may, when executed by one or more processors, cause the one or more processors to determine an award value or award values to associate with at least one credit symbol of a plurality of symbols displayed in a symbol display area on one or more displays of a gaming device in association with a play of a game of chance on the gaming device by selecting, for each such credit symbol, an award value from an award value list, wherein each selection of an award value from the award value list is of an award value that is in a list position in the award value list that is offset by a first number of list positions from the list position of the award value most recently selected from the award value list in association with the play of the game of chance, wherein the first number is greater than or equal to zero. The computer-executable instructions may, when executed by one or more processors, further cause the one or more processors to cause each award value selected for each such credit symbol to be displayed on the one or more displays of a gaming device in association with that credit symbol in the symbol display area.

In some implementations, the one or more non-transitory, computer-readable media may further store additional computer-executable instructions which, when executed by the one or more processors, further cause the one or more processors to, for each selection of one of the award values, randomly select the first number from a first set of positional offsets.

In some such implementations, the one or more non-transitory, computer-readable media may further store additional computer-executable instructions which, when executed by the one or more processors, further cause the one or more processors to determine an initial award value to associate with a first credit symbol of the plurality of symbols prior to determining the award value or award values to associate with the at least one credit symbol of the plurality of symbols, and select the first set of positional offsets from a plurality of sets of positional offsets based on information associated with the initial award value.

In some implementations, the one or more non-transitory, computer-readable media may further store additional computer-executable instructions which, when executed by the one or more processors, further cause the one or more processors to cause the award value associated with each credit symbol to be displayed in association with display of that symbol in the reel display area.

In some such implementations, the one or more non-transitory, computer-readable media may further store additional computer-executable instructions which, when executed by the one or more processors, further cause the one or more processors to cause the displays of the award values associated with the credit symbols to be initiated sequentially in the same order as the award values are determined for association with the credit symbols.

In some implementations, the award values may be listed in ascending order in the award value list. In some other implementations, the award values may be listed in descending order in the award value list.

In some implementations, a method may be provided that includes determining, by one or more processors of a gaming system, an award value or award values to associate with at least one credit symbol of a plurality of symbols displayed in a symbol display area on one or more displays of a gaming device in association with a play of a game of chance on the gaming device by selecting, for each such credit symbol, an award value from an award value list, wherein each selection of an award value from the award value list is of an award value that is in a list position in the award value list that is offset by a first number of list positions from the list position of the award value most recently selected from the award value list in association with the play of the game of chance, wherein the first number is greater than or equal to zero. The method may further include causing, by the one or more processors of the gaming system, each award value selected for each such credit symbol to be displayed on the one or more displays of a gaming device in association with that credit symbol in the symbol display area.

In some implementations, the method may further include randomly selecting the first number from a first set of positional offsets.

In some such implementations, the method may further include determining an initial award value to associate with a first credit symbol of the plurality of symbols prior to determining the award value or award values to associate with the at least one credit symbol of the plurality of symbols and selecting the first set of positional offsets from a plurality of sets of positional offsets based on information associated with the initial award value.

In some implementations, the method may further include causing the award value associated with each credit symbol to be displayed in association with display of that symbol in the reel display area.

In some implementations, the method may further include causing the displays of the award values associated with the credit symbols to be initiated sequentially in the same order as the award values are determined for association with the credit symbols.

In some implementations, the award values may be listed in ascending or descending order in the award value list.

BRIEF DESCRIPTION OF THE DRAWINGS

FIG. 10 depicts an example list of positional offsets and an example list of credit values.

FIG. 12 depicts an example of multiple lists of positional offsets and an example list of credit values.

The Figures are provided for the purpose of providing examples and clarity regarding various aspects of this disclosure and are not intended to be limiting.

DETAILED DESCRIPTION

As discussed above, when credit values are to be assigned to credit symbols that are displayed as part of an outcome for a game of chance, the selection of those credit values may be made by first selecting an initial credit value from a list of credit values to assign to a first credit symbol and then selecting additional credit values to assign to additional credit symbols beyond the first credit symbol. Each selection of an additional credit value may be made by selecting a positional offset from a plurality of positional offsets and then assigning the credit value in the list of credit values that is at a list position in the list of credit values equal to the list position of the credit value most recently assigned to one of the credit symbols plus the selected positional offset. The initial credit value and the positional offsets may each be randomly selected from their respective lists, and the credit values and positional offsets may have weights associated therewith that affect the probability of each such credit value and/or position offset being selected.

These concepts are discussed in more detail below. However, prior to such discussion, an overview of games of chance and their basic operation is provided for further context.

The following discussion provides overall context for gaming machines that may be used to implement GUIs such as are described above and later herein. Following this overview, a more focused discussion of the GUI concepts discussed above is provided.

Figure 1:
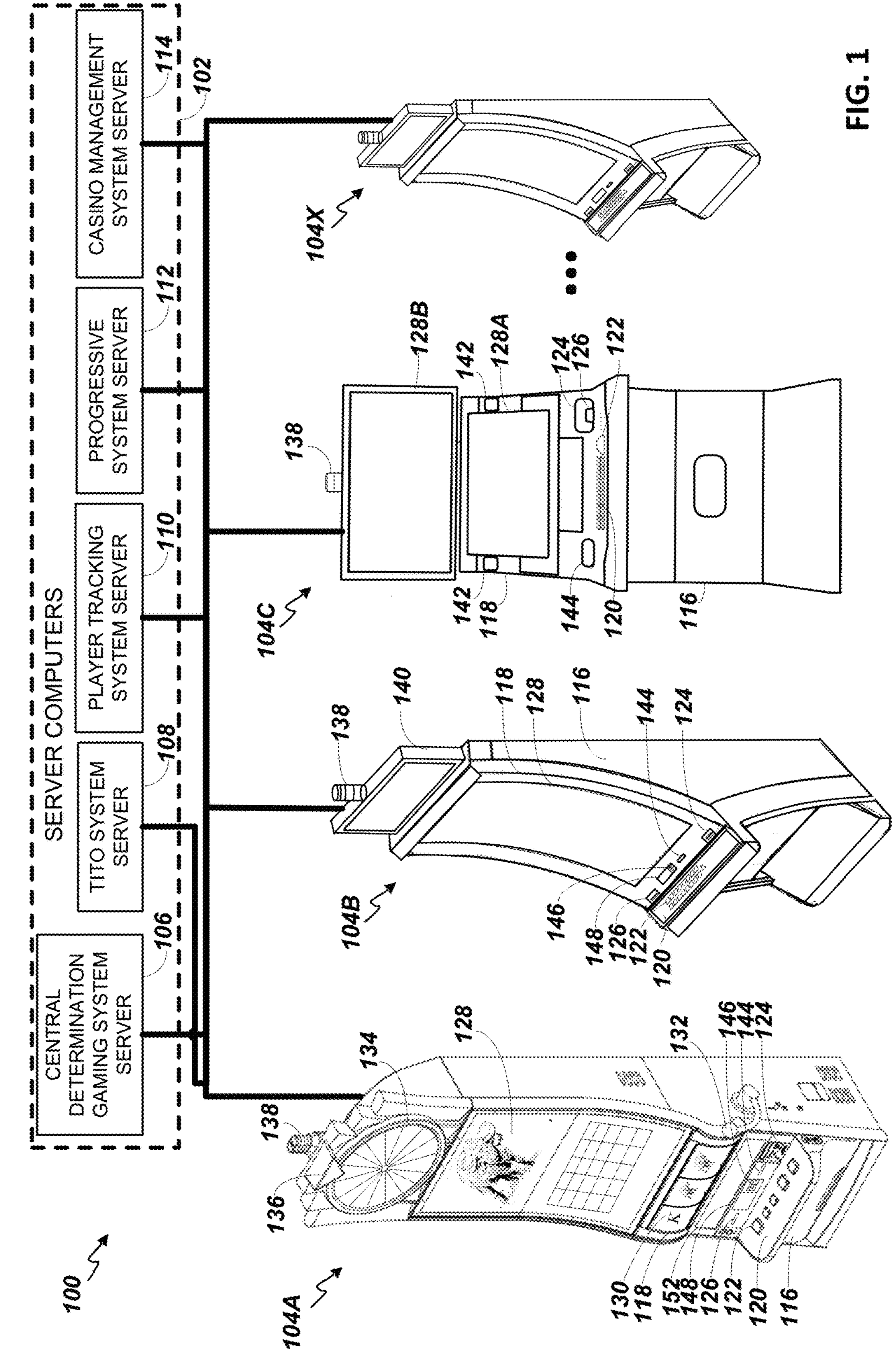
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat© Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
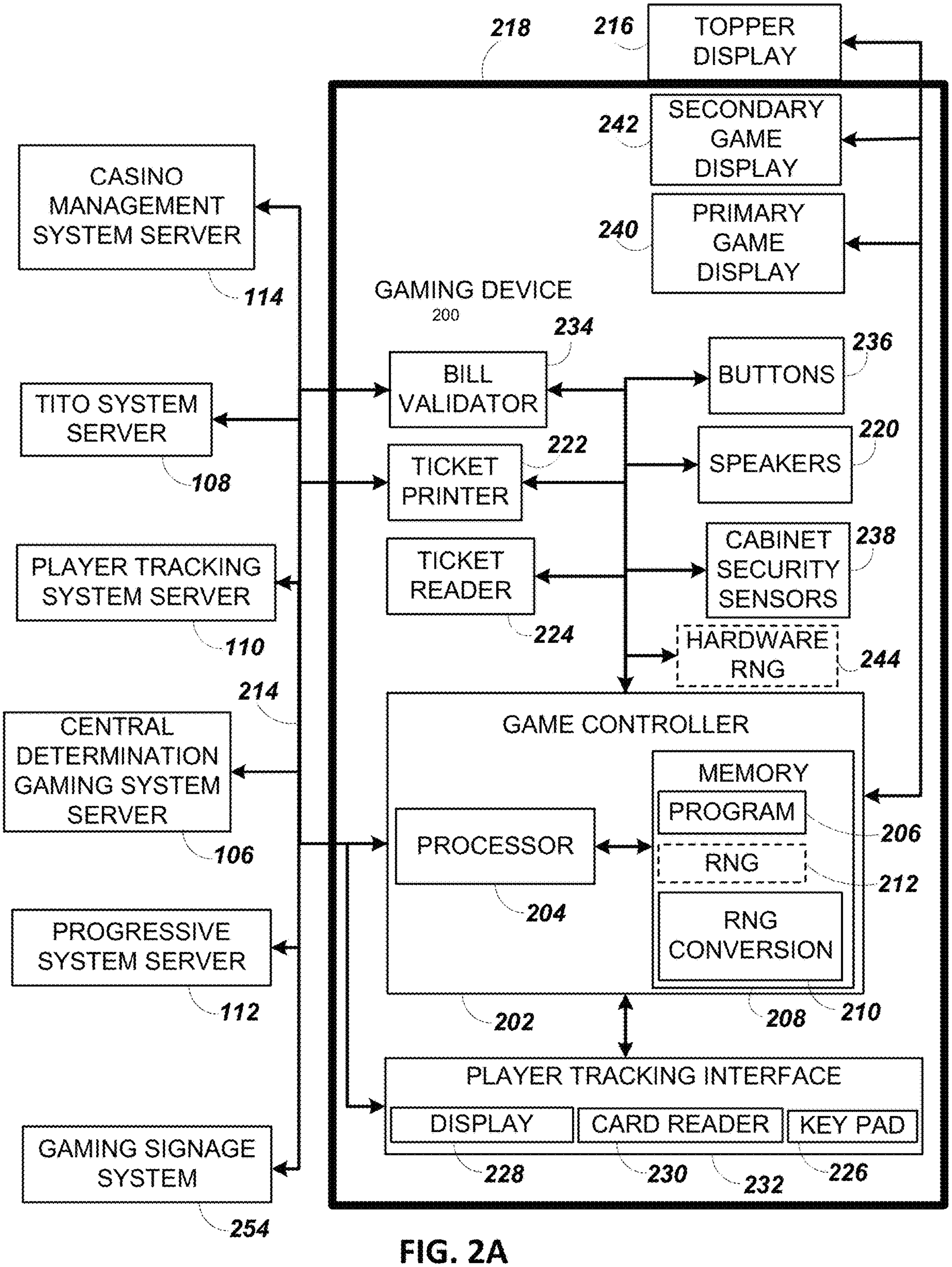
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat© Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat©

Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS© system manufactured by Aristocrat© Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
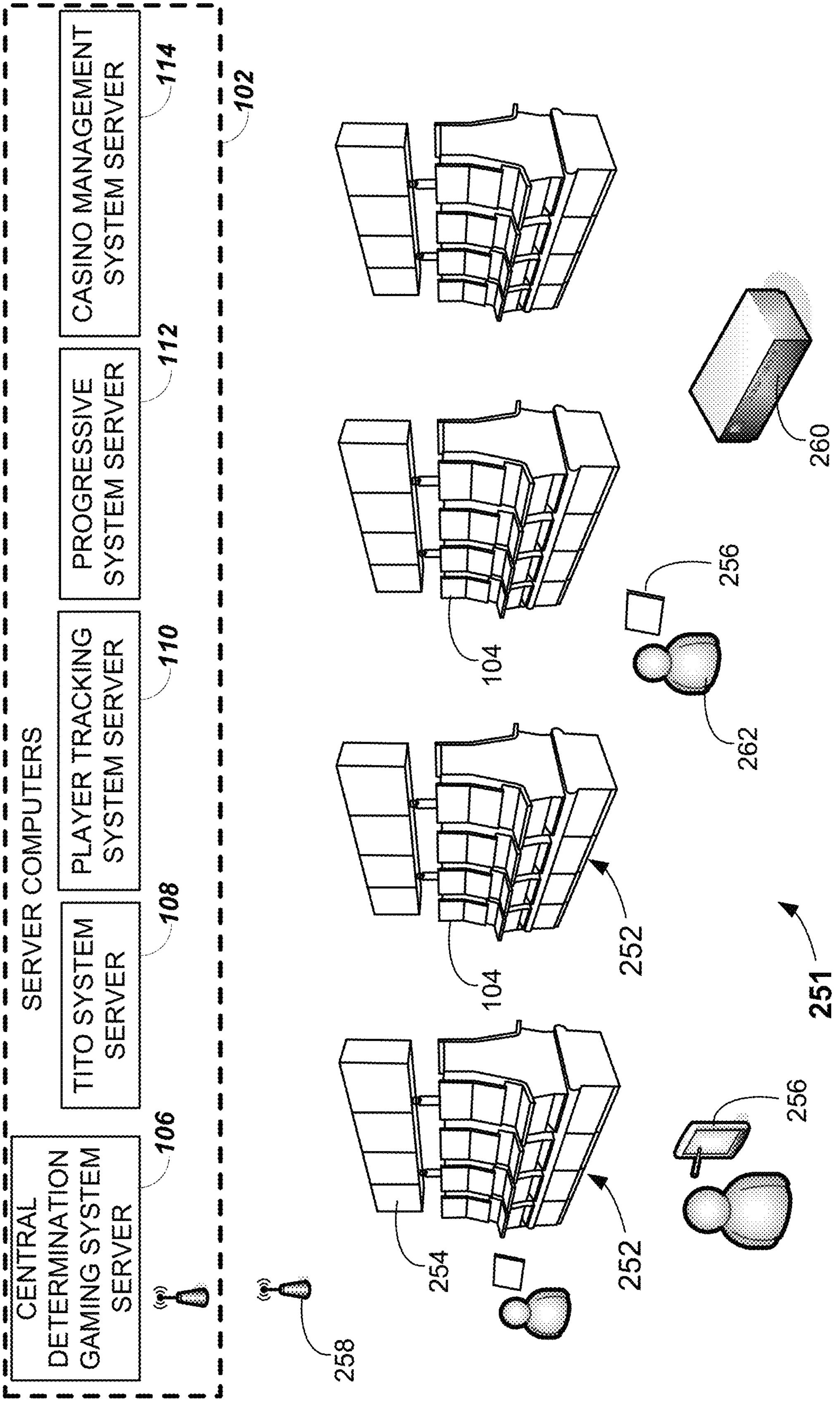
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
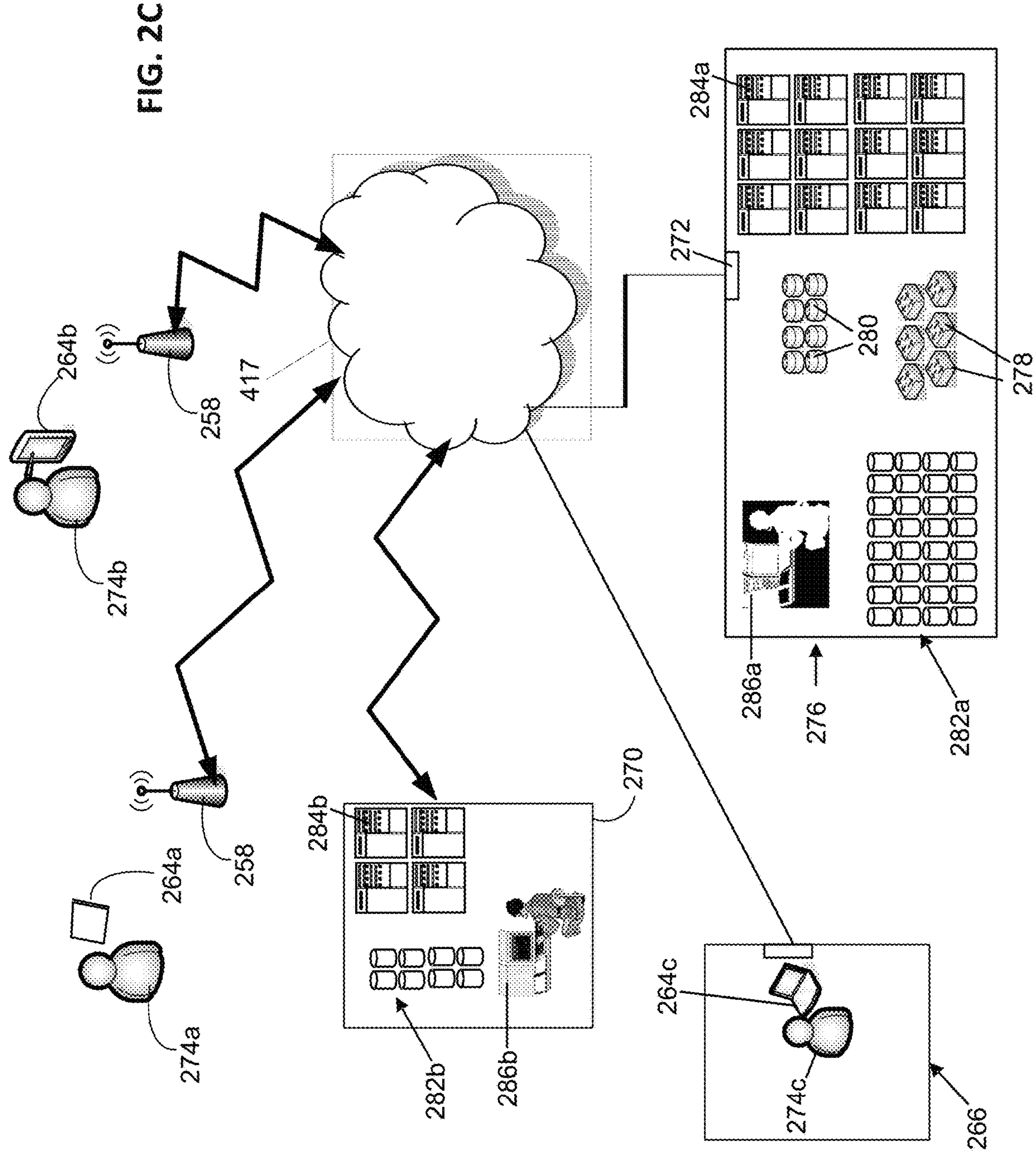
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
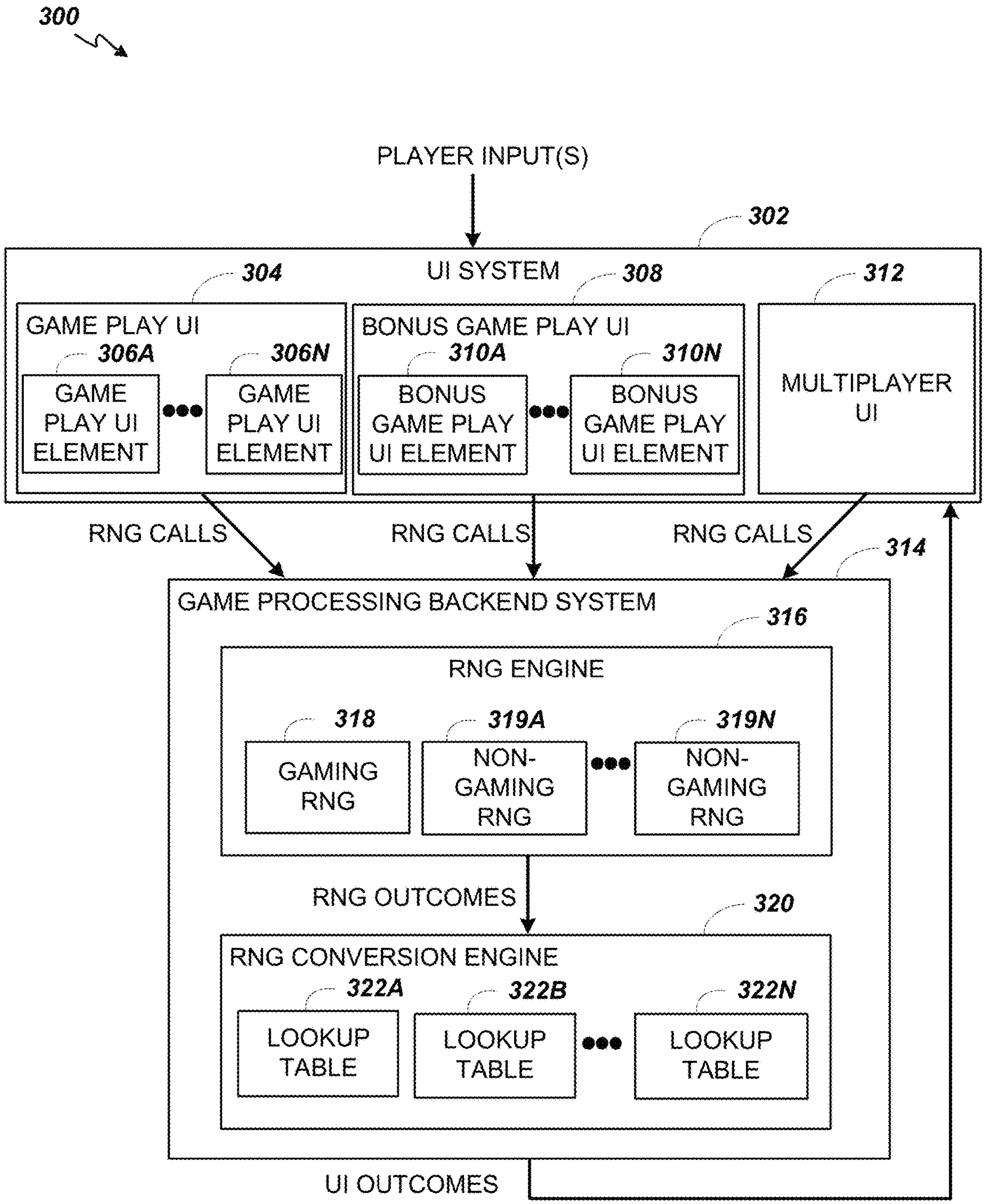
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIGS. 4 through 9 depict a graphical user interface (GUI) for a game of chance in which credit symbols may be displayed as part of a game outcome. Such credit symbols may have various attributes, e.g., they may be considered "wild" and/or may trigger a feature game if present in sufficient quantity in a game outcome, but, for the purposes of this disclosure, are to be understood to be any symbol that is to have a credit value associated therewith and then displayed to the player after the outcome having the credit symbols is displayed.

It will be understood that while credit symbols and credit values are used in the examples below, other implementations may feature other types of awards. Thus, the concepts discussed herein as featuring credit symbols and credit values may be understood to more generally apply to award symbols and awards, with the awards being assigned to the award symbols in a manner similar to how credit values are assigned to credit symbols in the examples below. For example, instead of credit values, multiplier values may be assigned to award symbols in some cases. In other cases, there may be no numerical value assigned to some or all award symbols-instead, the awards may be an in-game power-up, a free drink, or other non-monetary or non-credit benefit.

Figure 4:
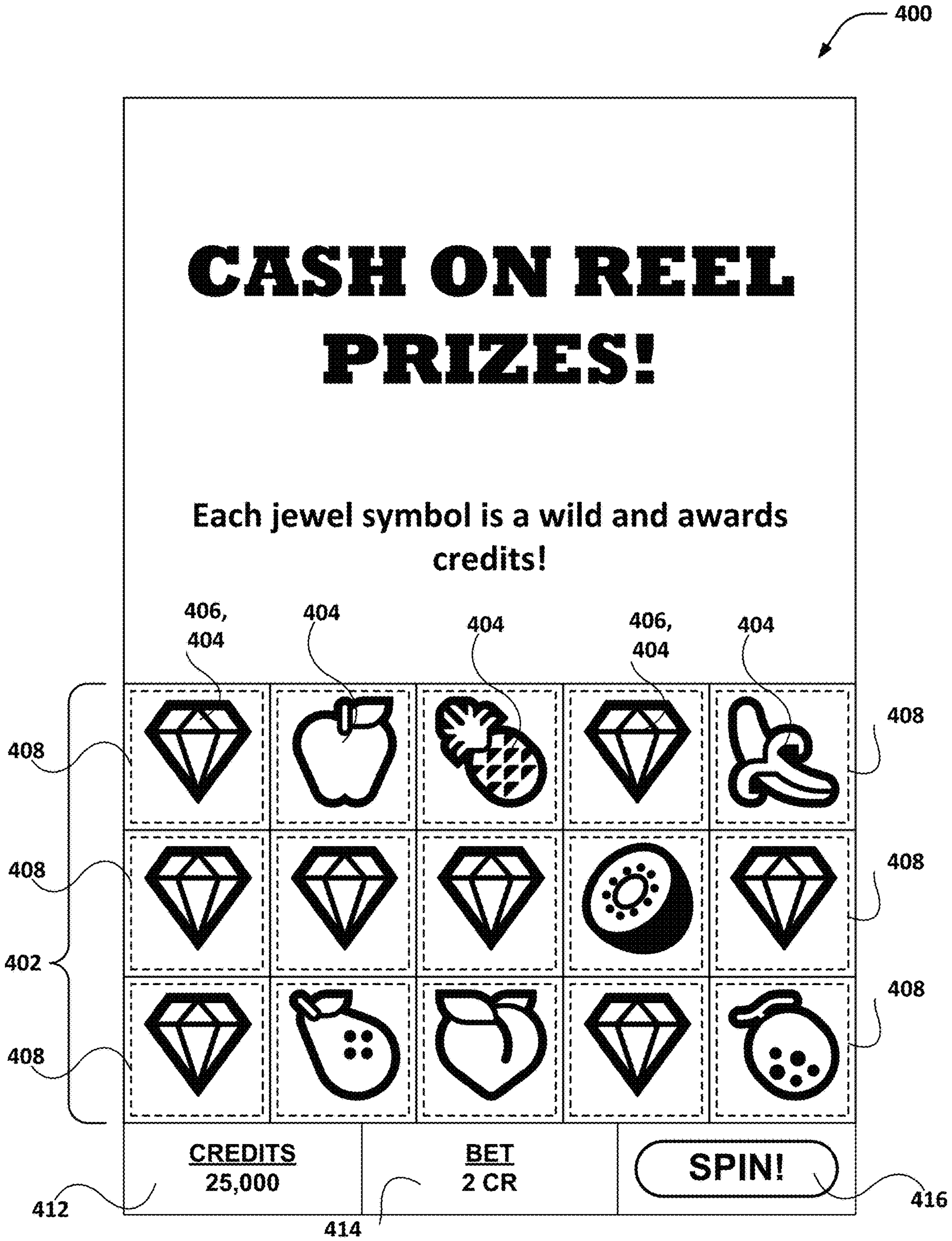
FIGS. 4 through 9 depict a game of chance GUI with credit values that are assigned to a subset of the displayed symbols being revealed in order of increasing value.

In FIG. 4, a game outcome for a game of chance has been presented. The game outcome is represented by the fifteen symbols 404 shown in a symbol display area 402 of the game of chance (only the symbols 404 in the top row of the symbol display area 402 are actually called out, however). Such symbols 404 may be randomly selected, e.g., off of virtual reel strips responsive to output from a random number generator, and then displayed in a corresponding symbol position 408 of the GUI 400 (the symbol positions 408 are represented by dashed-outline squares in FIG. 4, but are omitted in later Figures).

The game outcome shown in FIG. 4 includes six credit symbols 406. In this example, the credit symbols 406 are diamond or jewel symbols (only the two credit symbols 406 in the top row of symbols 404 are called out, but it will be apparent that there are eight total such credit symbols 406 in the outcome displayed in FIG. 4).

Also shown in the GUI 400 of FIG. 4 are a play button 416, a bet indicator 414, and a credit indicator 412. The play button 416 may be configured to initiate a play of the game of chance using the bet level indicated by the bet indicator 414 when selected. The credit indicator may illustrate the number of credits that the player has available to play with in the game of chance.

As discussed above, the credit symbols 406 may each be assigned a credit value. The credit values for the credit symbols may then be sequentially displayed in ascending order. FIGS. 5 through 9 depict the GUI of FIG. 4 during various stages of the credit values assigned to the credit symbols 406 being revealed or displayed.

It will be appreciated that when reference herein is made to credit values being displayed in ascending or descending order, this is also inclusive of initiating the display of the credit values in ascending or descending order. For example, displaying a credit value may take the form of an animation, e.g., an animation of a spinning coin having a particular credit value as the denomination of that coin. In such implementations, the start of such an animation may be considered to be the "display" of the credit value even if the credit value is not initially visible to the player at the start of the animation. If such an animation is long enough, the next display of a credit value may be initiated before the prior display of a credit value has completed. This, however, is still considered to be, within the scope of this disclosure, displaying the credit values sequentially.

Figure 5:
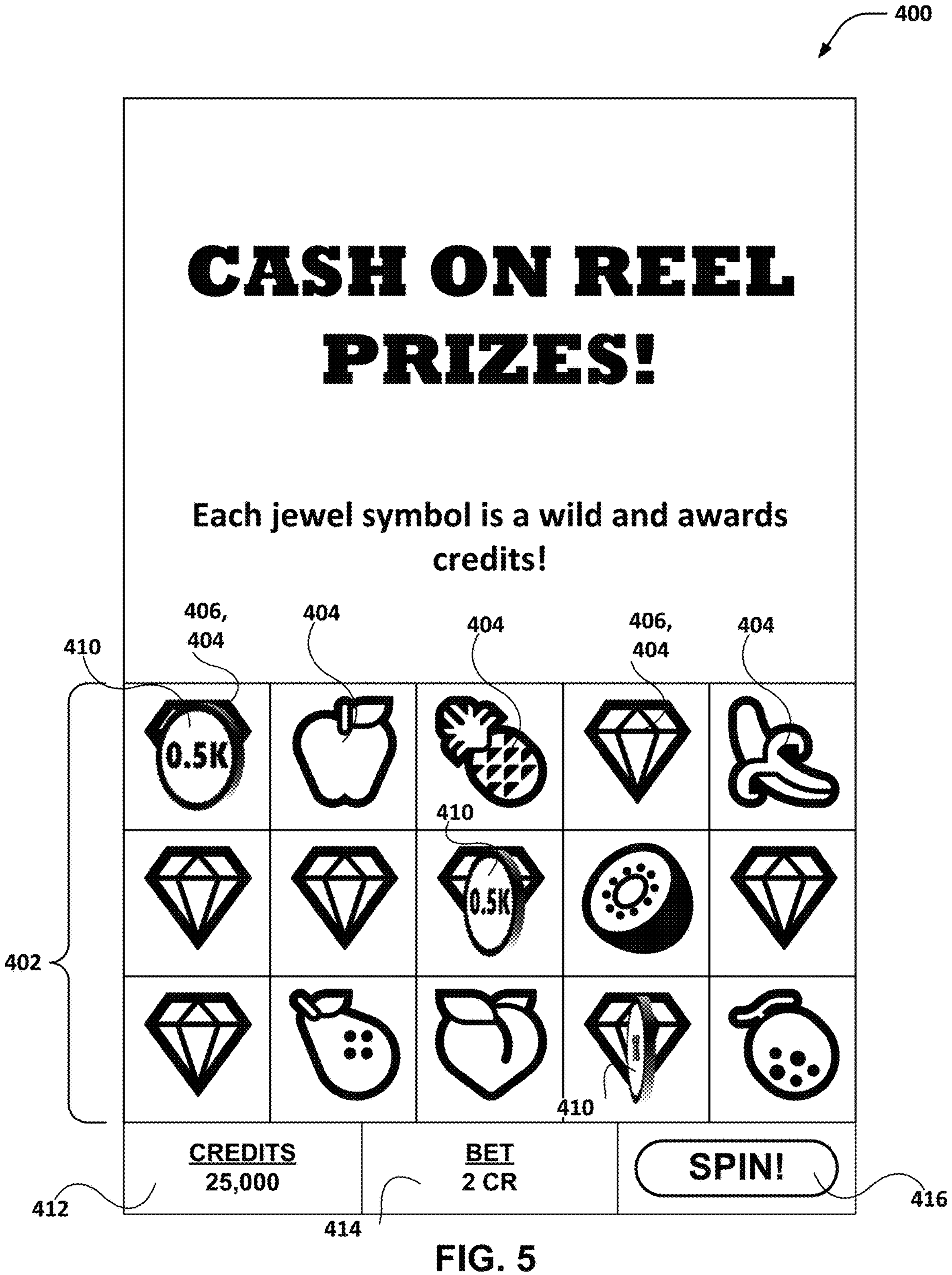

In FIG. 5, three value indicators 410 are now visible in the upper left symbol position 408, the middle symbol position 408, and the fourth symbol position 408 from the bottom left. Each value indicator 410 represents an animation of a spinning coin bearing as a denomination the credit value assigned to the credit symbol 406 in that symbol position 408. In this case, the animations of the spinning coins are each at a different point in the animation, reflecting that each animation started at a different point in time. The first animation to begin (and thus, according to the convention established in the previous paragraph, the first credit value to be displayed) was for the credit symbol 406 in the symbol position 408 in the upper left corner of the symbol display area 402; the coin for this animation depicts a credit value of 500 credits (0.5K). The next animation to begin was for the credit symbol 406 in the middle symbol position 408 of the symbol display area 402. The coin for this animation also depicts a credit value of 500 credits (0.5K). It will be noted that references herein to ascending or descending order do not require that each succeeding value in the order necessarily exceed or be less than the preceding value—there may be multiple credit values in the ascending or descending order that are the same, although all such credit values that are the same value would be caused to be displayed before proceeding to the next highest (or next lowest, depending on whether the credit values are displayed in ascending or descending order). In FIG. 5, the third animation to be initiated was for the credit symbol 406 in the fourth from the left symbol position 408 in the bottom row of the symbol display area 402. This third value indicator 410 depicts a credit value of 1000 credits (1K).

Figure 6:
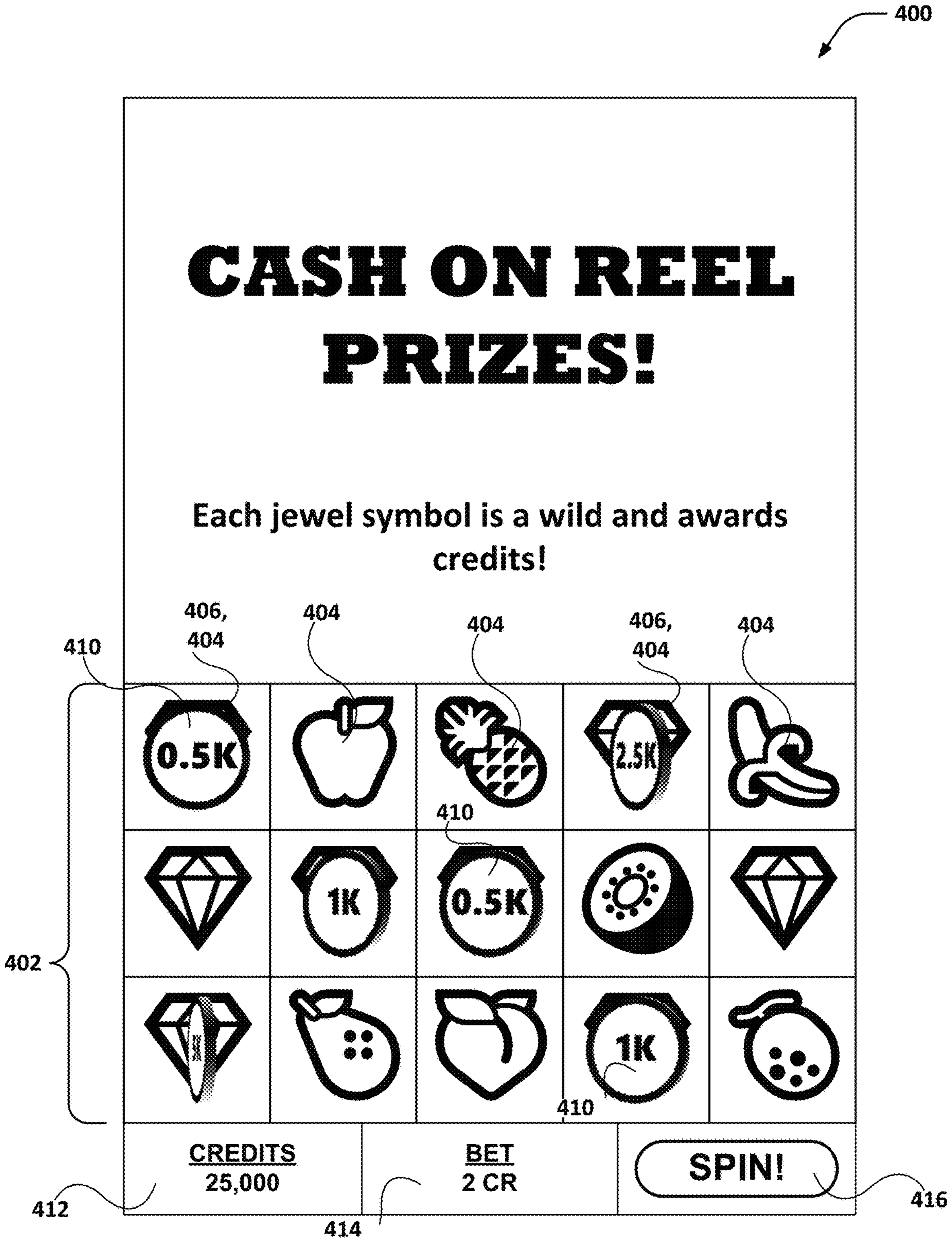

In FIG. 6, it can be seen the value indicators 410 for the 0.5K credit values have completed their animations, and animations for three additional value indicators 410 have been initiated. The value indicator 410 in the second symbol position 408 from the left in the middle row of symbol positions 408 was the fourth value indicator 410 to be displayed (or to have its animation initiated). This fourth value indicator 410 indicates a credit value of 1000 credits (1K). The fifth value indicator 410 to have its animation initiated was in the symbol position 408 in the fourth symbol position 408 from the left in the upper row of symbol positions 408. The fifth value indicator 410 indicates a credit value of 2500 credits (2.5K). The sixth value indicator 410 to have its animation initiated was in the symbol position 408 in the bottom left symbol position 408. The sixth value indicator 410 indicates a credit value of 5000 credits (5K).

Figure 7:
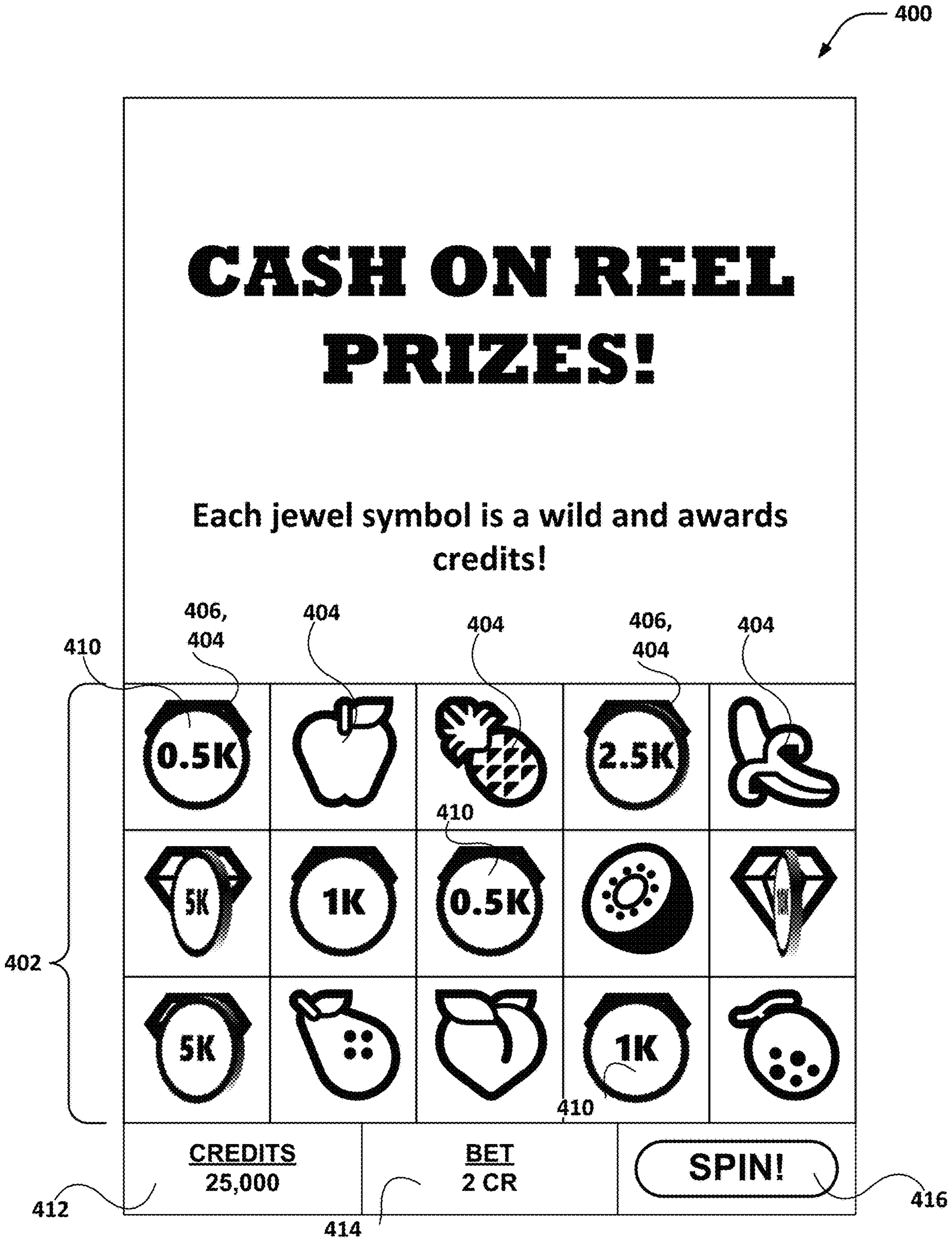

In FIG. 7, it can be seen that the last two value indicators 410 have initiated their animations. The value indicator 410 in leftmost symbol position 408 in the middle row the second symbol position 408 from the left in the middle row of symbol positions 408 was the seventh value indicator 410 to be displayed (or to have its animation initiated). This seventh value indicator 410 indicates a credit value of 5000 credits (5K). The last value indicator 410 to have its animation initiated was in the symbol position 408 in the far right symbol position 408 in the middle row of symbol positions 408. The last value indicator 410 indicates a credit value of 10000 credits (10K).

Figure 8:
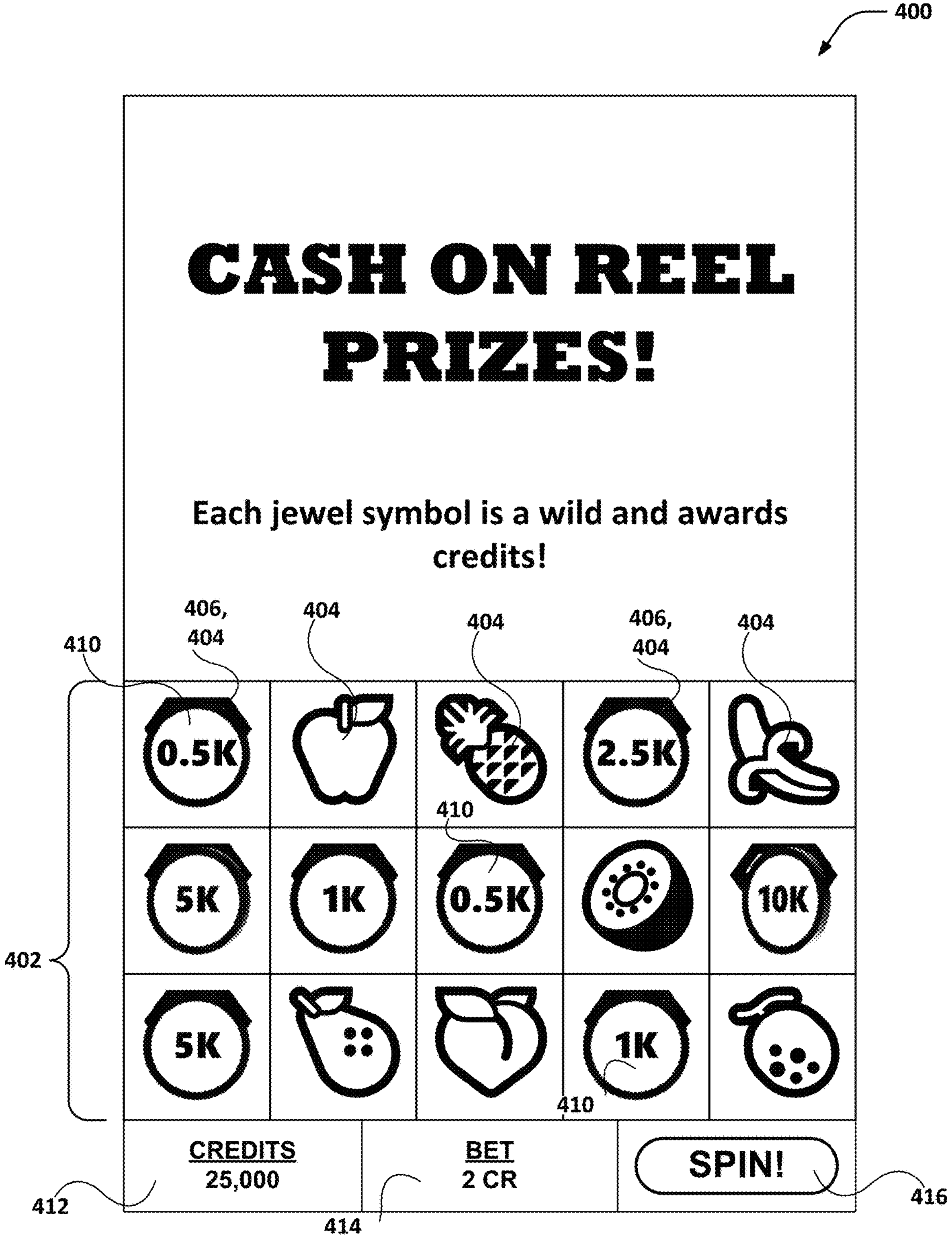
Figure 9:
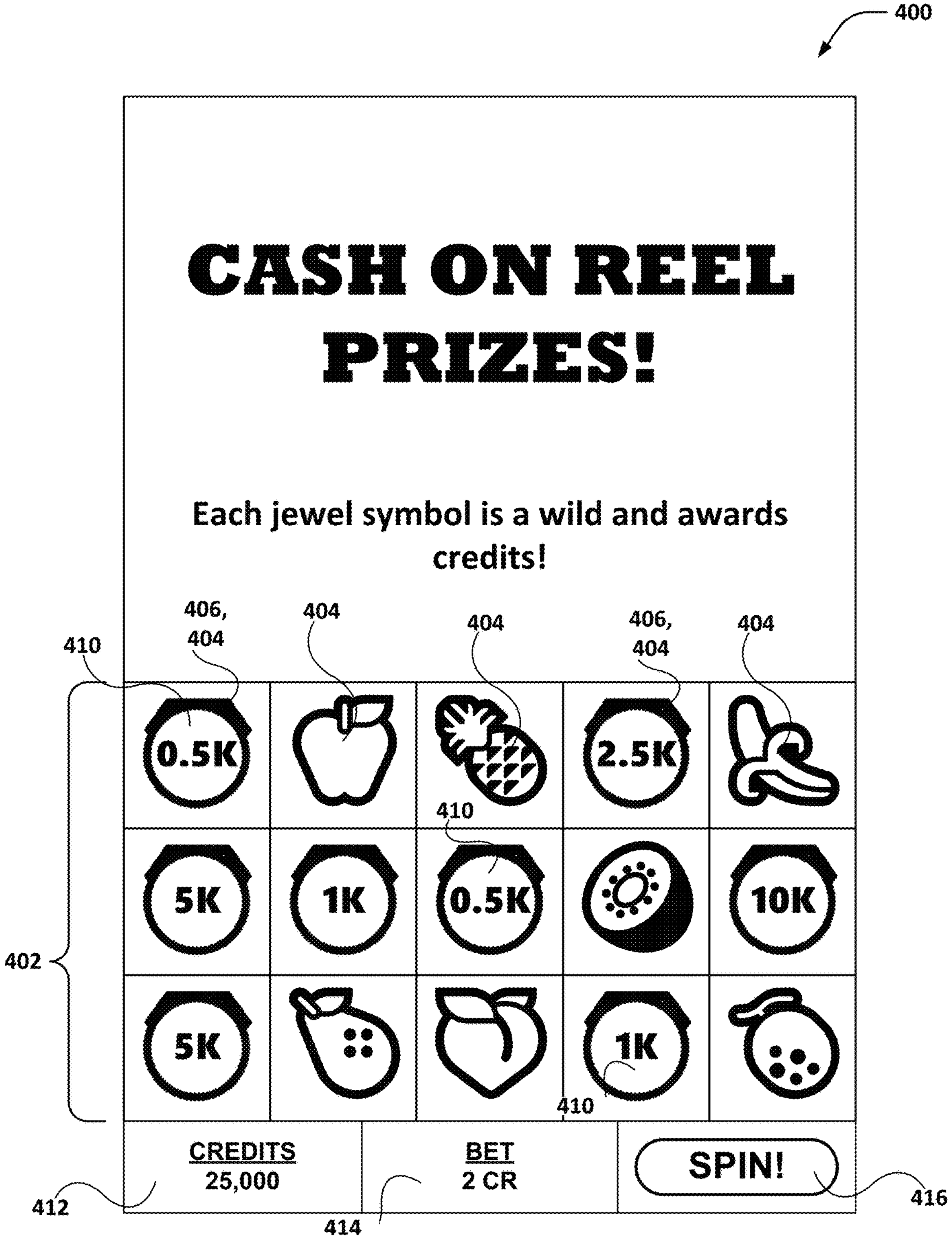

FIGS. 8 and 9 show the animations for the last value indicators 410 completing. As will be evident, such a display of value indicators 410 for the credit values assigned to the credit symbols 406 results in the assigned credit values being revealed to the player in ascending order, such that the player knows that whatever credit values are yet to be revealed will be at least as high as the highest credit value displayed thus far or even higher than that credit value.

The above discussion is provided to illustrate how credit values assigned to credit symbols are displayed in ascending order. It will be appreciated that such credit values may be selected for the credit symbols in question using any of a variety of mechanisms, as discussed earlier. The following discussion, however, focuses on the specific techniques for doing so provided for in this disclosure.

As discussed earlier, each credit value that is selected to be assigned to a given credit symbol may be drawn from a list, table, array, or other data structure (referred to generally herein simply as a "list") that includes a plurality of credit values that are arranged in a specified sequence, e.g., ascending or descending. It will be appreciated that the specified sequence may, in some instances, be in an order other than ascending or descending, should that be desired for a particular game of chance.

FIG. 10 depicts two data structures that may be used in the techniques discussed herein. At right in FIG. 10 is a table of credit values 1022 representing a credit value list 1020. Each credit value 1022 is associated with a credit value weight 1024. The credit values 1022 represent potential credit values that may be assigned to credit symbols in a corresponding game of chance. The credit value weights 1024 may be used when making an initial selection of a credit value 1022 from the credit value list 1020. The leftmost column of the table of credit values 1022 indicates the list position of each credit value 1022, i.e., where in the credit value list 1022 each individual credit value 1022 is located.

At left in FIG. 10 is a table representing a list 1030 of positional offsets 1032. Each positional offset 1032 is associated with a positional offset weight 1034.

Figure 11:
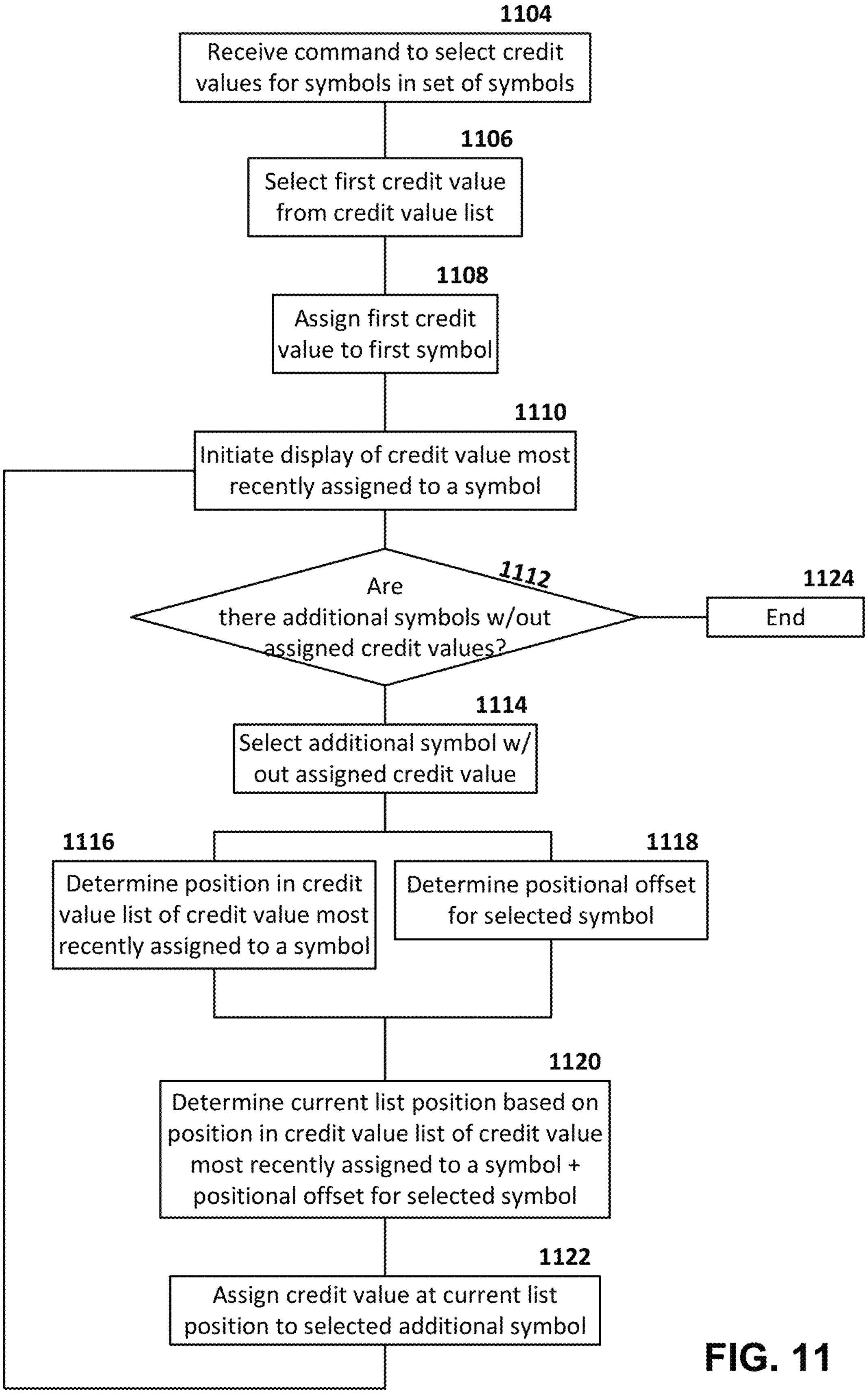
FIG. 11 depicts a flow diagram for a technique for dynamically assigning credit values according to this disclosure.

Reference is now made to FIG. 11, which depicts a flow chart of a technique for selecting credit values for credit symbols. In block 1104, a command or other communication or signal may be received that indicates that credit values are to be selected for symbols in a set of symbols (the set of symbols may, for example, be a set of credit symbols).

In block 1104, a first credit value may be selected from a credit value list, e.g., such as the credit value list 1020. Such selection may be made, in some cases, randomly. For example, a random number generator may generate a random outcome that is then mapped to one of the listed credit values 1022 according to the relative credit value weights 1024 in order to select one of the listed credit values 1022. For example, for the credit value list 1020, the random number generator may be configured to produce a number that is between 0 and the sum of all of the listed credit value weights 1024. Each credit value weight 1024 may then be converted to a range of numbers within that sum that correlates in number with the listed credit value weight 1024. If the outcome that is generated by the random number generator falls within the range for a particular listed credit value 1022, that will result in that credit value 1022 being randomly selected. For example, the credit value weights 1024 that are shown add up to a total value of 1,510,265, so the random number generator in such an example may be configured to provide randomly generated values, e.g., integer values, between 0 and 1,510,265, inclusive. The credit values 1022 may, as noted above, be associated with different subranges of numbers within the output range of the random number generator. For example, the credit value of 10 credits may be associated with a subrange of 0 to 450,000, while the credit value of 25 credits would be associated with a subrange of 450,001 to 800,000 and the credit value of 50 credits would be associated with a subrange of 800,001 to 1,050,000, and so forth. If the random number generator generates a value of 502,123, for example, that would result in a selection of the 25 credit value list entry.

The selection of the initial credit value may also be made, in some instances, according to other techniques as well. For example, in some instances, not every credit value 1022 may have an associated weighting and be available for selection as an initial credit value. For example, in some instances, the credit values 1022 that are available for selection as the initial credit value may be limited to a subset of the listed credit values 1022, e.g., the ten lowest-value credit values 1022. This may help ensure that an initial credit value 1022 is selected that still allows for subsequently selected credit values 1022 to be selected that are higher in value. In other implementations, the initial credit value may be selected in some other manner, e.g., it may always be set to be the first credit value in the list of credit value 1020.

Once selected, the initial credit value may be assigned to the first symbol in block 1108. In block 1110, a display of the credit value most recently assigned to a symbol in the set of symbols (the initial credit value assigned to the first symbol, in this case) may be initiated. It will be understood that while the technique of FIG. 11 features the display of each credit value occurring before a subsequent credit value is selected, this need not be the case-all or some of the credit values may be selected before the display of any credit value is caused to be initiated. However, the credit values would still be caused to be displayed in the order desired, e.g., ascending or descending order, as the case may be.

In block 1112, a determination may be made as to whether there are any additional symbols in the set of symbols that do not yet have an assigned credit value. If there are not, the technique may proceed to block 1124, in which the technique may conclude. If there are such additional symbols, the technique may proceed to block 1114, in which one of the additional symbols that is lacking an assigned credit value is selected. The technique may then proceed to blocks 1116 and 1118 (these blocks may be performed in parallel or in series, as desired). In block 1116, a determination may be made as to the position in the credit value list of the credit value most recently assigned to a symbol. For example, if the only other symbol in the set of symbols that has a credit value assigned thereto is the first symbol, then the determination in block 1116 would identify the position in the credit value list 1020 of the initial credit value.

In block 1118, a determination may be made as to a positional offset for the additional symbol selected in block 1114. Such a determination may be made, for example, by randomly selecting a positional offset 1032 from the positional offset list 1030. As with the credit value list, the positional offsets 1030 may each have a positional offset weight 1034 that may be used to perform a weighted random selection from the positional offset list 1030. For example, in the positional offset list 1030, there are positional offsets of 0, 1, 2, and 3, with selection weights of 20, 5, 2, and 1, respectively. Thus, the positional offset of 0 would generally be randomly selected about 71% of the time, the positional offset of 1 would generally be randomly selected about 18% of the time, and so forth.

In block 1120, a current list position for the additional symbol selected in block 1114 may be determined by adding the selected positional offset for that additional symbol to the position in the credit value list of the credit value most recently assigned to a symbol. Put another way, the current list position may be determined by adding the list position of the initial credit value to the cumulative positional offset for all additional symbols that have had positional offsets selected.

By way of example, consider the situation where the credit value 1022 that was most recently assigned to a symbol was in the fifth position in the credit value list 1020 (as indicated by the triangle pointer to the left of the credit value list 1020 in FIG. 10). A determination has also been made that the positional offset for the next additional symbol that is to be assigned a credit value is two, as indicated by the triangular pointer to the left of the positional offset list 1030 in FIG. 10. The credit value 1022 that is to be assigned to the additional symbol that is currently being processed according to the technique of FIG. 11 would thus be the credit value 150, which is in the seventh list position (fifth list position+two list positions) in the credit value list 1020.

The technique may then proceed to block 1122, in which the credit value at the list position determined in block 1120 may be assigned to the additional symbol selected in block 1114. It will be understood that in situations in which adding the positional offset for a selected additional symbol to the list position of the most recently assigned credit value results in a current list position that exceeds the number of credit values in the list, the credit value that is at the end of the credit value list may simply be used instead.

Furthermore, as can be seen in the example of FIG. 10, some positional offset lists 1030 may be configured, e.g., by having a positional offset of zero as one of the positional offset amounts, such that there is the possibility that there is no change in the credit value for some symbols in the set of symbols. In other implementations, however, there may only be positive integer positional offsets in the positional offset list such that every credit value selected from the credit value list for assignment to a given set of symbols is guaranteed to be higher in value than the most recent previously selected credit value.

It will be appreciated that by using a technique such as that discussed above with respect to FIG. 11, credit values may be dynamically assigned to symbols, e.g., credit symbols, so that such credit values are arranged in an order that is consistent with a specified order of credit values while adhering to no particular pre-defined order.

The above technique may also be implemented to provide additional control over the selection of the positional offsets for the additional symbols beyond the first symbol. For example, as noted earlier, there may be multiple lists of positional offsets available for use when selecting a positional offset. The particular positional offset list that is used when selecting a positional offset may be selected based on one or more parameters. For example, in situations in which the initial credit value that is selected for the first symbol is relatively high in value compared to the overall population of credit values in the credit value list, it may be desirable to select positional offsets from a set of positional offsets in which the chances of obtaining a non-zero positional offset are decreased, or at least the chance of obtaining a higher-value positional offset is decreased, compared with chances of doing so with another set of positional offsets that may be selected from when the initial credit value is at a lower value.

FIG. 12 illustrates an example of this. As shown in FIG. 12, a credit value list 1220 is provided at top that is identical to the credit value list 1020 except that a "positional offset list" column has been added at the right side. Each subset of four credit values has been assigned to a different letter A/B/C/D/E. Each such letter corresponds to a different positional offset list (or to a different column in a single positional offset list 1230, as shown at bottom in FIG. 12). The different positional offset lists (or different columns of the same positional offset list) may have positional offset weights 1234 that differ for each of the different letters A/B/C/D/E. Thus, when the initial credit value that is selected for the first symbol is in the subset of credit values assigned to letter B, the positional offsets that will be selected in order to determine credit values to assign to additional symbols beyond the first symbol will be randomly selected from the listed positional offsets according to the weights listed in the column marked "positional offset list B" in FIG. 12. As can be seen in FIG. 12, the positional offset lists associated with higher-value initial credit values that are to be assigned to the first symbol generally have reduced chances of having larger positional offsets selected for the credit values that are to be assigned to additional symbols as compared with the lower-value initial credit values. In this case, the positional offset list associated with the "E" group of highest-value initial credit values has selection weights of zero for both the 2- and 3-position positional offsets (meaning they will never be selected. The 0-position positional offset in this group has a weight of sixty, while the 1-position positional offset has a weight of one. Thus, when the player is presented with an initial credit value in the "E" group of credit values as the credit value assigned to the first symbol, the chances of credit values assigned to additional symbols beyond the first symbol increasing beyond that amount may be quite small, e.g., ~1.6%, and such increases may, if they even occur, only result in an increase of one list position, e.g., from 1500 credits to 2000 credits, at a time. This helps reduce the chance that the highest-value credit value will be reached too quickly, e.g., in a single credit value increase, and then be stagnant for the remainder of the credit value assignment process.

It will be understood that in some implementations, there may be situations in which a positional offset is selected that, when added to the current list position, results in an offset list position that is technically beyond the last list position in the list. For example, if the current list position in the credit value list shown in FIG. 12 is position 19 (2000 credits) and a positional offset of 2 list positions is selected for the next list position, this would technically result in the next list position being position 21, which does not technically exist. In the context of this application, such scenarios are to be understood to result in the credit value associated with the end of the credit value list that is exceeded being selected for the next credit value to be assigned. Thus, in the example above, the credit value selected for list position "21" would be the same as the credit value for list position 20, i.e., 2500 credits. This can be accomplished in a variety of ways. For example, the credit value list may have a number of duplicate entries at the end of the list, e.g., list positions 21-62 which may all be assigned the same value, e.g., 2500 credits. In such a credit value list, even if the highest credit value (list position 20) is chosen as the initial credit value to be assigned to the first symbol and even if every credit value then assigned to the additional symbols is offset from the most recent previous credit value list entry by the maximum amount of three (an extremely unlikely event), there will still be an actual list entry at each potential offset list position (for a maximum of 15 symbols to which credit values will be assigned, in this example). Another way that this issue may be addressed is to simply check the current list position that is generated by adding the current positional offset to the most recent previous list position to see if it results in a list position that exceeds the number of list entries in the credit value list-if so, then the current list position may simply be automatically changed to be the last list position prior to retrieving the credit value associated with the current list position.

It will be understood as well that in some implementations, there may be different positional offset lists and/or credit value lists that may be used depending on the number of symbols in the set of symbols and/or the bet level used by the player and/or the number of symbols to which credit values are to still be assigned and/or the value of the most recently assigned credit value. Thus, for example, a determination may be made as to how many symbols there are in the set of symbols to which credit values are to be assigned (either prior to assignment of any credit values in association with a displayed symbol set or, in some cases, during assignment of credit values in association with a displayed symbol set), and then the credit value list and/or the positional offset list may be selected from multiple such lists based on that quantity. For example, if there are six or seven symbols in the set of symbols, a first positional offset list and/or a first credit value list may be used, while if there are eight or more symbols in the first set of symbols, then a second credit value list and/or second positional offset list may be used. A similar approach may be used for different bet levels that a player may be allowed to use to place wagers in the game of chance, with each bet level or group of bet levels having a corresponding credit value list and/or positional offset list that is used when that bet level is active.

It will be understood that the various GUIs discussed herein may be implemented entirely locally, e.g., by a processor or processors of a single device, such as a smartphone, or may be provided using processors located in different devices or systems. Information regarding the selection of symbols, awards associated with feature game trigger symbols, etc., may be transmitted, e.g., via a network connection (wired, wireless, or a mixture of both) to another device, e.g., a smartphone, the processor or processors of which may then implement the GUI using the information symbols, awards, etc. Such information may be generated and/or sent in response to receipt of a request from such another device, e.g., a request from a smartphone for the server to provide such information. Such distributed-computing implementations of the GUI provisioning techniques discussed herein is to be understood to also be within the scope of this disclosure.

It will be appreciated that in such distributed computing arrangements, the computer-executable instructions for implementing the GUI may be distributed between different memory devices located in different devices, e.g., the computer-executable instructions for selecting symbols stored on one or more memory devices of a server, while computer-executable instructions presenting the GUI.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.
b) The client device stores instructions for causing A, B, and C to occur, but the server stores no instructions that cause A, B, and C to occur.
c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.
d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.
e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.
b) The second set of one or more processors may be caused to perform each of A, B, and C, and the first set of one or more processors may not perform any of A, B, or C.

c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.

d) The first set of one or more processors may be caused to perform A and a portion of B, and the second set of one or more processors may be caused to perform C and the remainder of B.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

one or more display devices, one or more processors, and one or more memory devices, the one or more memory devices storing computer-executable instructions which, when executed by the one or more processors, cause the one or more processors to:

determine an outcome for a play of a game of chance based on output from a hardware random number generator;

determine an award value or award values to associate with at least one credit symbol of a plurality of symbols displayed in a symbol display area of the one or more display devices in association with the outcome for the play of the game of chance by selecting, for each such credit symbol, an award value from an award value list, wherein each selection of an award value from the award value list is of an award value that is in a list position in the award value list that is offset by a first number of list positions from the list position of the award value most recently selected from the award value list in association with the play of the game of chance, wherein the first number is greater than or equal to zero and each offset is in the same direction in the award value list; and cause each award value selected for each such credit symbol to be displayed in the same location as that credit symbol in the symbol display area, wherein each credit symbol displayed in association with the outcome for the play of the game of chance is first displayed for that outcome without display of the associated award value and wherein the displays of the award values associated with the credit symbols are initiated in the same order as the award values are selected from the award value list.

2. The system of claim 1, wherein the one or more memory devices store further computer-executable instructions which, when executed by the one or more processors, further cause the one or more processors to, for each selection of one of the award values, randomly select the first number from a first set of positional offsets.

3. The system of claim 2, wherein the one or more memory devices store further computer-executable instructions which, when executed by the one or more processors, further cause the one or more processors to:

determine an initial award value to associate with a first credit symbol of the plurality of symbols prior to determining the award value or award values to associate with the at least one credit symbol of the plurality of symbols; and select the first set of positional offsets from a plurality of sets of positional offsets based on information associated with the initial award value.

4. The system of claim 1, wherein the one or more memory devices store further computer-executable instructions which, when executed by the one or more processors, further cause the one or more processors to cause the award value associated with each credit symbol to be displayed in association with display of that symbol in the symbol display area.

5. The system of claim 4, wherein the one or more memory devices store further computer-executable instructions which, when executed by the one or more processors, further cause the one or more processors to cause the displays of the award values associated with the credit symbols to be in the same order as the award values are selected for association with the credit symbols.

6. The system of claim 1, wherein the award values are listed in ascending order in the award value list.

7. The system of claim 1, wherein the award values are listed in descending order in the award value list.

8. One or more non-transitory, computer-readable media storing computer-executable instructions which, when executed by one or more processors, cause the one or more processors to:

determine an outcome for a play of a game of chance based on output from a hardware random number generator;

determine an award value or award values to associate with at least one credit symbol of a plurality of symbols displayed in a symbol display area on one or more display devices of a gaming device in association with the outcome for the play of the game of chance on the gaming device by selecting, for each such credit symbol, an award value from an award value list, wherein each selection of an award value from the award value list is of an award value that is in a list position in the award value list that is offset by a first number of list positions from the list position of the award value most recently selected from the award value list in association with the play of the game of chance, wherein the first number is greater than or equal to zero and each offset is in the same direction in the award value list; and cause each award value selected for each such credit symbol to be displayed on the one or more display devices of the gaming device in the same location as that credit symbol in the symbol display area, wherein each credit symbol displayed in association with the outcome for the play of the game of chance is first displayed for that outcome without display of the associated award value and wherein the displays of the award values associated with the credit symbols are initiated in the same order as the award values are selected from the award value list.

9. The one or more non-transitory, computer-readable media of claim 8, further storing additional computer-executable instructions which, when executed by the one or more processors, further cause the one or more processors to, for each selection of one of the award values, randomly select the first number from a first set of positional offsets.

10. The one or more non-transitory, computer-readable media of claim 9, further storing additional computer-executable instructions which, when executed by the one or more processors, further cause the one or more processors to:

determine an initial award value to associate with a first credit symbol of the plurality of symbols prior to determining the award value or award values to associate with the at least one credit symbol of the plurality of symbols; and select the first set of positional offsets from a plurality of sets of positional offsets based on information associated with the initial award value.

11. The one or more non-transitory, computer-readable media of claim 8, further storing additional computer-executable instructions which, when executed by the one or more processors, further cause the one or more processors to cause the award value associated with each credit symbol to be displayed in association with display of that symbol in the symbol display area.

12. The one or more non-transitory, computer-readable media of claim 11, further storing additional computer-executable instructions which, when executed by the one or more processors, further cause the one or more processors to cause the displays of the award values associated with the credit symbols to be in the same order as the award values are selected for association with the credit symbols.

13. The one or more non-transitory, computer-readable media of claim 8, wherein the award values are listed in ascending order in the award value list.

14. The one or more non-transitory, computer-readable media of claim 8, wherein the award values are listed in descending order in the award value list.

15. A method comprising:

determining an outcome for play of a game of chance based on output from a hardware random number generator of a gaming system;

determining, by one or more processors of the gaming system, an award value or award values to associate with at least one credit symbol of a plurality of symbols displayed in a symbol display area on one or more display devices of a gaming device in association with the outcome of the play of the game of chance on the gaming device by selecting, for each such credit symbol, an award value from an award value list, wherein each selection of an award value from the award value list is of an award value that is in a list position in the award value list that is offset by a first number of list positions from the list position of the award value most recently selected from the award value list in association with the play of the game of chance, wherein the first number is greater than or equal to zero and each offset is in the same direction in the award value list; and causing, by the one or more processors of the gaming system, each award value selected for each such credit symbol to be displayed on the one or more display devices of the gaming device in the same location as that credit symbol in the symbol display area, wherein each credit symbol displayed in association with the outcome for the play of the game of chance is first displayed for that outcome without display of the associated award value and wherein the displays of the award values associated with the credit symbols are initiated in the same order as the award values are selected from the award value list.

16. The method of claim 15, further comprising randomly selecting the first number from a first set of positional offsets.

17. The method of claim 16, further comprising:

determining an initial award value to associate with a first credit symbol of the plurality of symbols prior to determining the award value or award values to associate with the at least one credit symbol of the plurality of symbols; and selecting the first set of positional offsets from a plurality of sets of positional offsets based on information associated with the initial award value.

18. The method of claim 15, further comprising causing the award value associated with each credit symbol to be displayed in association with display of that symbol in the symbol display area.

19. The method of claim 18, further comprising causing the displays of the award values associated with the credit symbols to be in the same order as the award values are selected for association with the credit symbols.

20. The method of claim 15, wherein the award values are listed in ascending or descending order in the award value list.

* * * * *